US005768327A

United States Patent [19]

Pinto et al.

[11] Patent Number: 5,768,327
[45] Date of Patent: Jun. 16, 1998

[54] METHOD AND APPARATUS FOR OPTICALLY COUNTING DISCRETE OBJECTS

[75] Inventors: Itzhak Pinto; Barbara Lyn Perozek; John Francis Chessa, all of Stamford, Conn.

[73] Assignee: Kirby Lester, Inc., Stamford, Conn.

[21] Appl. No.: 663,488

[22] Filed: Jun. 13, 1996

[51] Int. Cl.⁶ .................................................. G06M 11/02
[52] U.S. Cl. ........................... 377/10; 377/7; 377/11
[58] Field of Search ................................. 377/10, 11, 6, 377/7, 53

[56] References Cited

U.S. PATENT DOCUMENTS

| 4,743,760 | 5/1988 | Giles | 250/222.2 |
| 5,313,508 | 5/1994 | Ditman et al. | 377/6 |
| 5,317,645 | 5/1994 | Perozek et al. | 382/8 |

*Primary Examiner*—Margaret Rose Wambach
*Attorney, Agent, or Firm*—David P. Gordon

[57] ABSTRACT

An object counter includes a feeding funnel having a frustroconical section, the narrow end of which is coupled to a substantially vertical feeding channel having a substantially rectangular cross section. A pair of linear optical sensor arrays are arranged along adjacent orthogonal sides of the feeding channel and a corresponding pair of collimated light sources are arranged along the opposite adjacent sides of the feeding channel such that each sensor in each array receives light the corresponding light source. Objects which are placed in the feeding funnel fall into the feeding channel and cast shadows on sensors in the arrays as they pass through the feeding channel. Outputs from each of the two linear optical arrays are processed separately, preferably according to various conservative criteria, and two object counts are thereby obtained. The higher of the two conservative counts is accepted as the accurate count and is displayed on a numeric display. In another embodiment, four sensor arrays and light sources are provided. The third and fourth sensor arrays and corresponding light sources are located downstream of the first and second arrays. The outputs of each of the sensor arrays are processed separately and the highest conservative count is accepted as the accurate count and is displayed on a numeric display.

18 Claims, 14 Drawing Sheets

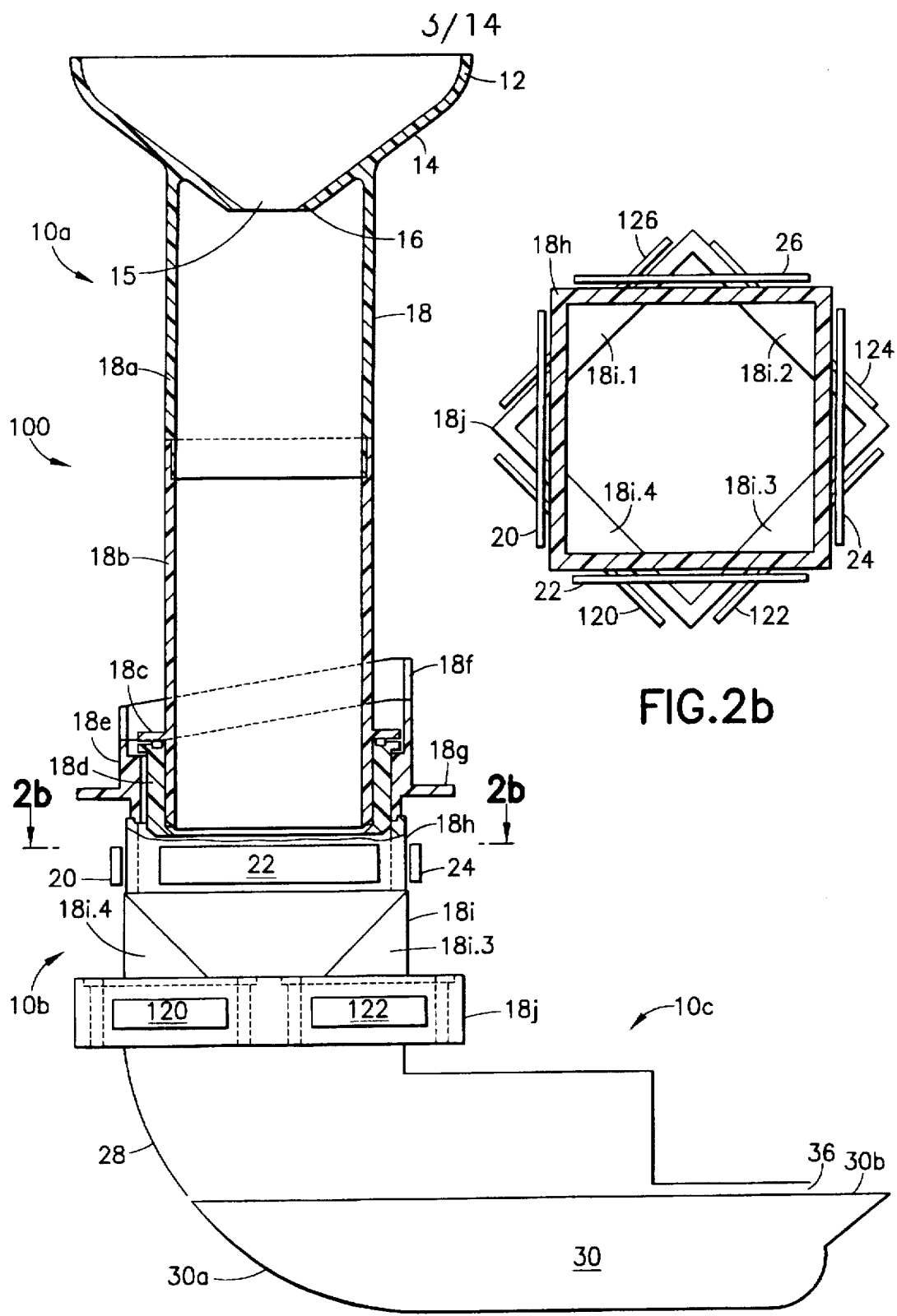

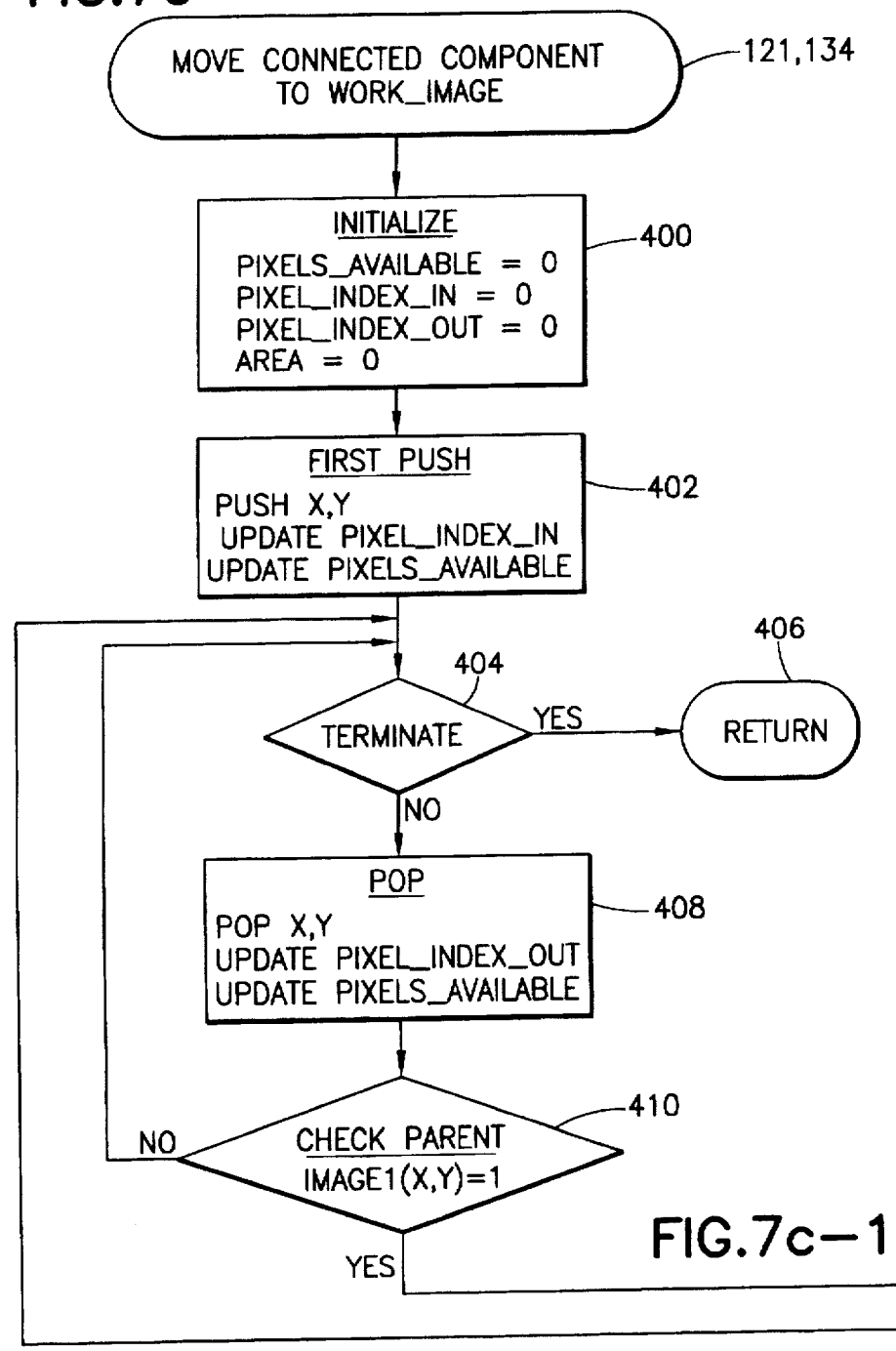

METHOD AND APPARATUS FOR OPTICALLY COUNTING DISCRETE OBJECTS

This application is related to co-owned U.S. Pat. No. 5,317,645, issued May 31, 1994, the complete disclosure of which is incorporated herein by reference.

BACKGROUND OF THE INVENTION

1. Field of the Invention

The invention relates to methods and apparatus for counting discrete objects. More particularly, the invention relates to methods and apparatus for optically counting discrete objects falling through a passageway.

2. State of the Art

There are many known devices for counting objects. Many of these known devices utilize an optical detector composed of light beams and photoelectric sensors arranged in a passageway such that objects falling through the passageway interrupt the light beams and the interruptions are detected by the photoelectric sensors. Known methods of counting objects with these types of devices include incrementing a counter every time an interruption in a light beam is detected. Relatively simple apparatus and methods may be used when counting regularly sized objects which fall through a passageway one after the other. Problems arise, however, when objects are not regularly sized or when objects are not vertically separated from each other (i.e. when they are bunched or clustered together) as they fall through the passageway past the optical detector.

U.S. Pat. No. 5,313,508 to Ditman et al., for example, addresses the problems associated with counting relatively thin objects such as keys. Relatively thin objects may fail to interrupt a light beam if oriented in a certain plane relative to the beam. Ditman et al. solves this problem by arranging two orthogonal arrays of light beams and photodetectors such that if the thin object is aligned parallel to one array of beams, thereby failing to interrupt a beam, it will interrupt a beam in the other array. The method taught by Ditman et al. involves alternating activation of the two arrays and summing the output of the two arrays to provide a single signal which increments a counter.

A more difficult problem arises when two or more objects are bunched or clustered together as they fall past the optical detector. In this situation, two or more objects will be counted as one object unless some measures are taken to determine when objects are bunched or clustered. U.S. Pat. No. 4,675,520 to Harsen et al. addresses the issue of counting two or more clustered or bunched objects. Harsen et al. arranges two orthogonal arrays of light beams and photodetectors to create an optical grid. Both arrays are activated and scanned simultaneously and repeatedly. The time-sequential outputs of each array is stored and a series of two dimensional matrices is derived which represent two dimensional images of the optical grid through which the objects have passed. The matrices are analyzed to determine how many objects have passed through the optical grid. The method disclosed by Harsen et al. for analyzing the matrix data, however, is mostly conceptual and it is unclear how the analysis produces accurate results.

Co-owned U.S. Pat. No. 5,317,645 discloses a method and apparatus for counting discrete objects which addresses the issue of counting two or more clustered or bunched objects which a simple optical sensor would count as one object. The apparatus disclosed includes a vibratory feeder which feeds objects onto an exit ramp within which a linear sensor array is located. The signal output of the linear sensor array is sampled periodically and stored. The sequential signal outputs are analyzed according to seven criteria which determine how many objects have passed by the linear sensor array.

It was heretofore believed that in order to provide an extremely accurate count, a vibratory feeder of some type was necessary so that a collection of objects to be counted could be reduced to a relatively orderly line of flow as they move past the sensor array. It was also believed that when no vibratory feeder is used, manual feeding of any quantity of objects must be done slowly so that the flow rate of the objects is not too high. It was also believed that objects should be directed down a ramp, rather than down a vertical drop in order to minimize the possibility that an object might bounce back past the sensor array and generate an erroneous count, as well as to minimize the chances of one object being hidden behind another object. It was also generally understood that if the objects are fed too fast past the sensor array, errors in counting might occur. In order to prevent overspeed feeding, prior art object counters monitored the number of objects counted per unit time and provided appropriate signals when an overspeed condition was determined.

The methods and apparatus disclosed in co-owned U.S. Pat. No. 5,317,645 are particularly well suited for counting pharmaceuticals (tablets, capsules, caplets, etc.). As such, the signal analysis applied to obtain an object count is designed to be conservative, i.e. any counting errors are undercounts rather than overcounts. An overcount is avoided because it might result in a patient receiving insufficient medication. As is known in the art, pharmaceuticals, particularly tablets and caplets, may become damaged (broken into pieces) prior to dispensing. With the known counting methods and apparatus, it is difficult or impossible to distinguish between a whole object and a fragment of an object. For example, a tablet which is broken into two pieces could inaccurately be counted as two whole tablets.

SUMMARY OF THE INVENTION

It is therefore an object of the invention to provide a method and apparatus for counting discrete objects which eliminates the need for a vibratory feeder.

It is also an object of the invention to provide a method and apparatus for counting discrete objects which is extremely accurate.

It is a further object of the invention to provide a method and apparatus for counting discrete objects which has an enhanced overspeed detection.

It is another object of the invention to provide a method and apparatus for counting discrete objects which counts objects falling in a substantially vertical path.

It is an additional object of the invention to provide a method and apparatus for counting discrete objects which distinguishes between whole objects and object fragments.

Another object of the invention is to provide a method and apparatus for counting objects in which a relatively large quantity of objects can be dispensed into the apparatus at one time.

In accord with these objects which will be discussed in detail below, the apparatus of the present invention includes a feeding funnel having a frustroconical section, the narrow end of which is coupled to a substantially vertical feeding channel preferably having a substantially rectangular cross section. In one embodiment of the invention, a pair of linear optical sensor arrays are arranged along adjacent orthogonal sides of the feeding channel and a corresponding pair of collimated light sources are arranged along the opposite adjacent sides of the feeding channel such that each sensor in each array receives light from the corresponding light source. The arrays and the light sources are arranged substantially horizontally. Objects which are placed in the feeding funnel fall into the feeding channel and cast shadows on sensors in the arrays as they pass through the feeding channel. Outputs from each of the linear optical arrays are processed separately, possibly including criteria described in U.S. Pat. No. 5,317,645, and two conservative object counts are thereby obtained for each of the sensor arrays. Using methods of the invention, the highest count is considered to be the count which is to be added to the total count and displayed.

In another embodiment of the invention, a second pair of sensors and light sources are arranged either downstream or upstream of the first pair. Using methods of the invention, corresponding images from the two pairs are analyzed and the highest count is considered to be the count which is to be added to the total count and displayed.

According to a presently preferred embodiment, the length of the feeding tube is dimensioned so that objects which fall into the tube in close temporal relationship are sufficiently spatially separated at the time they are counted to minimize bunching or clustering. For typical pharmaceutical products the length of the feeding tube is preferably approximately eight inches. It is also preferable to dimension the cross section of the feeding tube relative to the size of the objects to be counted, i.e. the width of the tube is preferably approximately 2.5 to 3 times the largest dimension of the largest object to be counted. This dimensioning aids in separation of the objects thereby minimizing bunching and clustering and also allows for the length of each sensor array to be approximately 2.5 to 3 times the largest dimension of the largest object to be counted. In the presently preferred embodiment of a pharmaceutical counter, forty-eight sensors are provided in each array and the feeding tube is approximately 2.4" by 2.4" in cross section.

The counter according to the invention does not require a vibratory feeder, but may be subject to overspeed feeding if objects are poured into the feeding funnel too quickly. In accord with the invention, an overspeed condition is adaptively determined by comparing a threshold value to a rate which is a function of the frequency of bunched or clustered objects. When a first overspeed condition is detected, a warning signal is provided. When overspeed reaches a critical condition wherein an accurate count is severely compromised, another signal is provided and the counter automatically resets or shuts down.

Another embodiment of the invention includes a variable delay feeding arrangement having a plurality of feeding channels through which objects fall at different rates. Objects poured into a funnel at the top of the variable delay arrangement are randomly directed to different channels so that the falling objects are separated temporally prior to entering the feeding funnel described above. This embodiment of the invention is particularly well suited for quality control operations. A package of product containing an alleged number of objects is emptied into the funnel at the top of the feeding arrangement so that the objects can be counted and the count compared to the alleged number of objects in the package.

In the presently preferred embodiment of the invention, a parabolic deflector is located underneath the bottom of the feeding channel and a removable object collector tray is arranged adjacent to the deflector. Objects passing through the channel land on the parabolic deflector and are deflected into the collector tray so that they will not bounce up into the feeding channel and register a redundant count.

According to the invention, fragments of objects (e.g. pills which have broken into pieces) are distinguished from whole objects by computing the average area of objects counted and distinguishing objects having an area which is sufficiently smaller than the average area as being object fragments. Fragments can be eliminated from the total count and the user can be notified of the presence of fragments. Similarly, unusually large objects can be detected and recognized as foreign objects.

Additional objects and advantages of the invention will become apparent to those skilled in the art upon reference to the detailed description taken in conjunction with the provided figures.

BRIEF DESCRIPTION OF THE DRAWINGS

FIG. 2a is a view similar to FIG. 2 of a second embodiment of the invention;

FIG. 2b is a sectional view taken along the line 2B—2B of FIG. 2a;

DETAILED DESCRIPTION OF THE PREFERRED EMBODIMENTS

Figure 1:
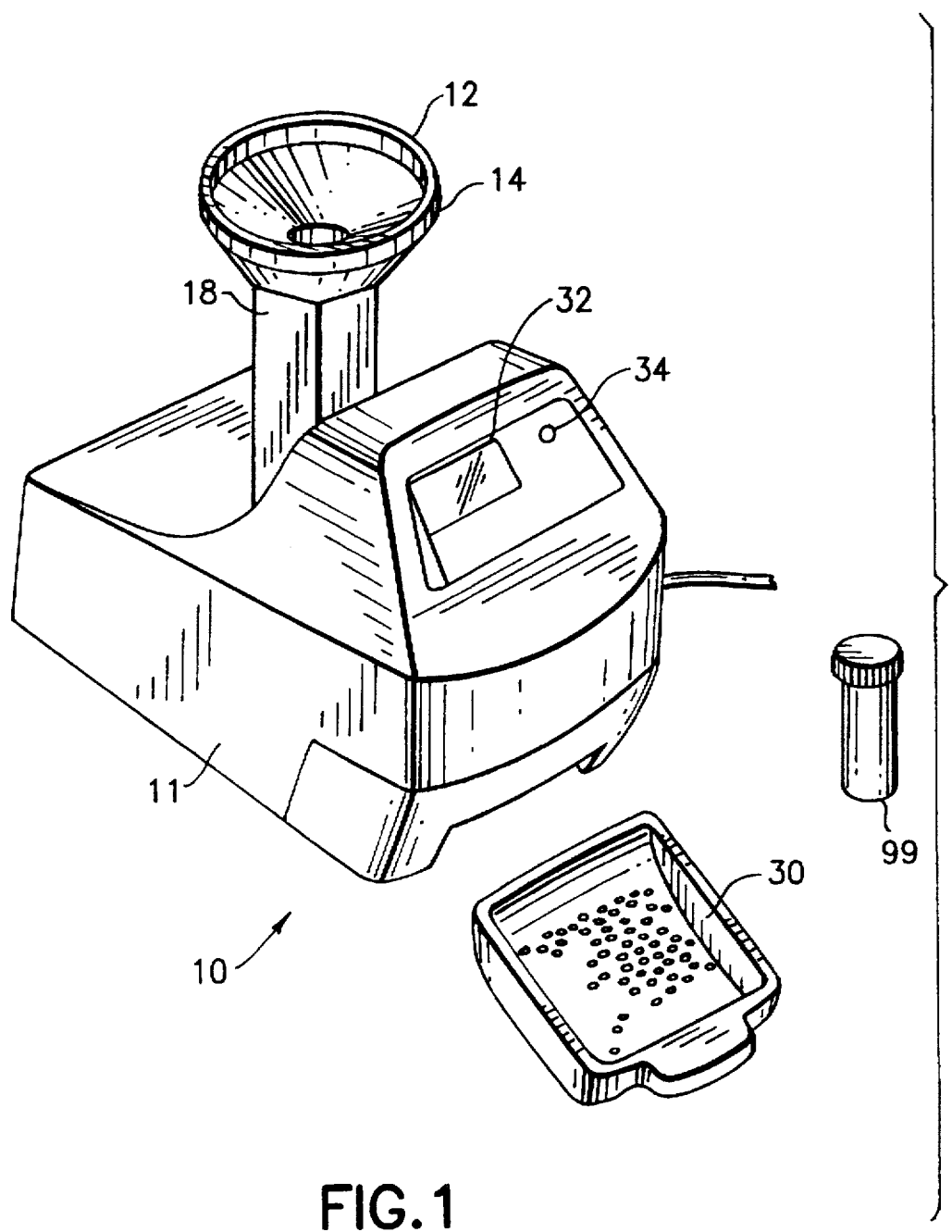
FIG. 1 is a perspective view of an object counter according to the invention.
Figure 2:
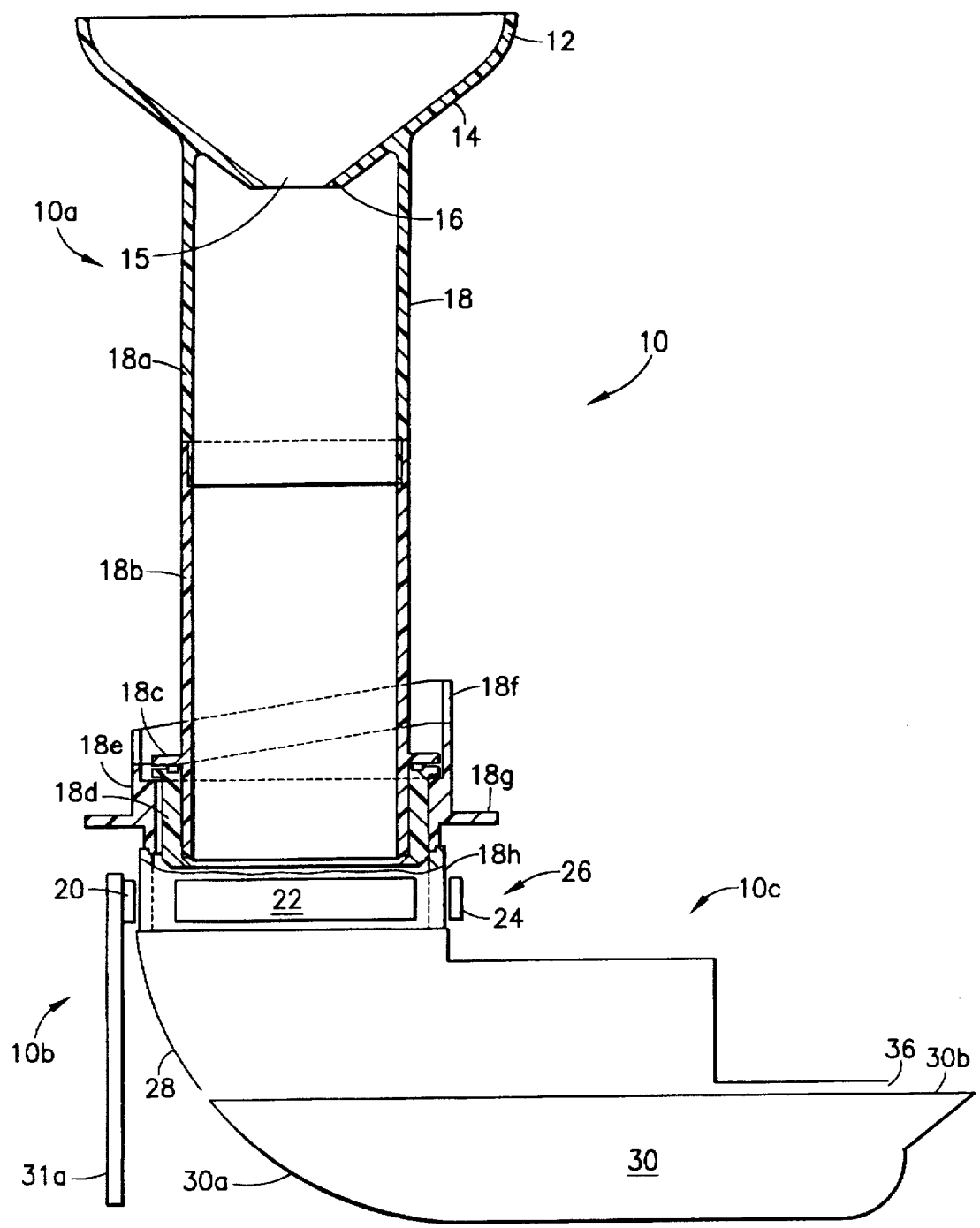
FIG. 2 is a broken transparent side elevation view in partial section of a portion of the counter of FIG. 1 including the feeding funnel, feeding channel, optical sensors, and parabolic deflector.
Figure 3:
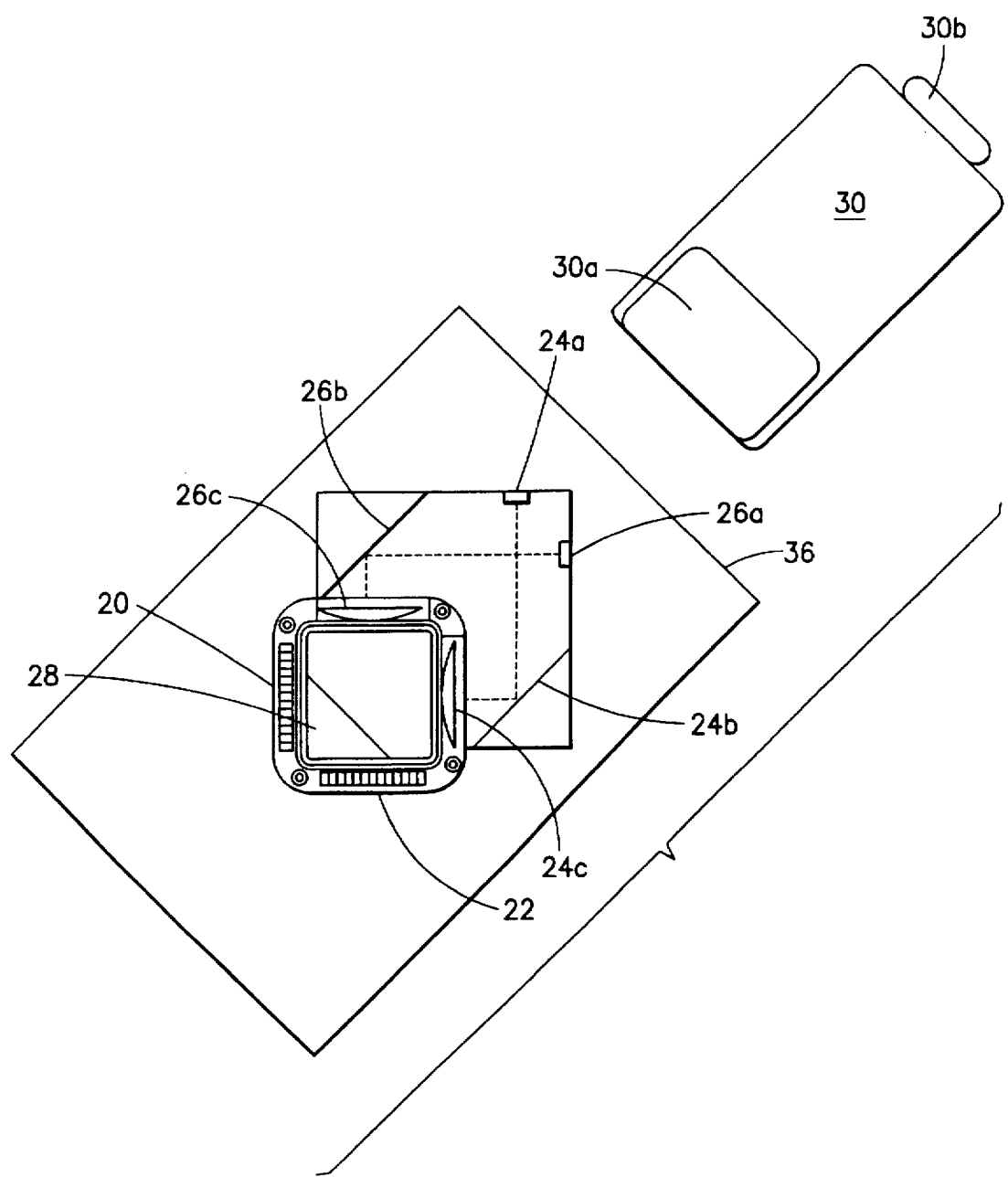
FIG. 3 is a partially transparent top view of the counter of FIG. 1 with the feeding funnel and feeding channel removed.

Referring now to FIGS. 1, 2, and 3, an object counter 10, according to the invention includes a feeding/separation section 10a, a sensing/electronic counting section 10b, and a receiving/dispensing section 10c. The feeding/separation section 10a has a feeding funnel 12 with a frustroconical section 14 having an opening 15 in its narrow end 16, and a substantially vertical feeding channel 18 having a substantially rectangular cross section. According to the presently preferred embodiment, the feeding channel 18 includes an upper portion 18a which is integrally molded with the feeding funnel 12, an intermediate portion 18b having a lower flange 18c and a reinforced lower side wall 18d, a supporting collar 18e having upper angled edges 18f (for conforming to the sloped portion of the housing 11 as seen in FIG. 1) and a lower mounting flange 18g, and an optical window 18h. With the provided arrangement, the channel 18 may be removed from the housing 11 of the counter 10 and separated into two pieces (18a and 18b) to conserve space during shipping and storage and to facilitate cleaning.

According to a presently preferred embodiment of the invention, in order to aid in the vertical separation of free-falling objects which are to be counted, the vertical distance from the narrow end 16 of the feeding funnel 12 to the sensor arrays 20, 22 (which are part of the sensing/electronic counting section 10b) is chosen to be at least six inches, and preferably approximately eight inches. Likewise, in order to aid in the horizontal separation of objects falling through the tube 18, the smallest horizontal dimension of the tube is chosen to be at least 2.5 times the largest dimension of the objects being counted. Thus, in a pharmaceutical counter as shown, the horizontal dimensions of the vertical feeding tube 18 are approximately 2.5 inches by 2.5 inches, as the largest tablet, pill or capsule expected to be counted is approximately 0.9 inches in its largest dimension.

The sensing/electronic counting section 10b of the object counter 10 includes a pair of linear horizontal optical sensor arrays 20, 22, a corresponding pair of collimated light sources 24, 26, and circuitry 31 including an LED display 32, microprocessors 40, 44, an overspeed warning indicator 46, a reset 48, all of which are discussed in more detail hereinafter with respect to FIGS. 4-6, 7a, and 7b. The optical sensors are arranged along adjacent orthogonal sides of the optical window 18h of the feeding channel 18, and the corresponding pairs of collimated light sources 24, 26 are arranged along adjacent sides of the window 18h such that each sensor array 20, 22 receives light from the corresponding light source 24, 26. Each sensor array 20, 22 preferably includes forty-eight sensors spaced approximately 0.05 inches apart horizontally. As shown in FIG. 2, at least some of the circuitry 31 may be incorporated on a PC board 31a which is coupled to one of the sensor arrays, e.g. 20, and supports the sensor array.

The receiving/dispensing portion 10c of the counter includes a parabolic deflector 28 which is provided below the sensor arrays for deflecting objects as described in more detail below, and a removable collector tray 30 which is provided for placement below the deflector 28. As will be discussed hereinafter, the collector tray 30 preferably includes a curved inner surface portion 30a which cooperates with and continues the curve of the parabolic deflector 28, and a handle 30b. The deflector 28 and curved surface portion 30a of the collector tray 30 together present a parabolic surface which prevents objects which are falling into the collector tray 30 from bouncing up into the feeding channel 18 and being recounted. It will be appreciated that the deflector 28 is housed in the counter housing 11. The counter housing 11 also includes a front tray receiving bay 36 for receiving the collector tray 30.

When the counter is assembled as shown in FIGS. 1 and 2, objects which are placed in the feeding funnel 12 fall into the feeding channel 18 and cast shadows on the sensor arrays 20, 22, as they fall past the sensor arrays. As is discussed below with reference to FIGS. 4-6, 7a and 7b, the shadows are used in determining a count. After passing the sensor arrays, the objects hit the parabolic deflector 28, 30a which directionally deflects the objects so that they do not bounce back up into the feeding channel 18.

As seen best in FIG. 3, the sensor arrays 20, 22 are arranged approximately 45° relative to the walls of the counter housing 11. The light sources 24, 26 according to the presently preferred embodiment, each include a photo emitter 24a, 26a, a deflecting mirror 24b, 26b, and a collimating lens 24c, 26c. The emitters, mirrors, and lenses are arranged so that the path of light from each emitter to a respective lens is deflected approximately 90°. This arrangement permits the housing 11 of the counter 10 to be more compact as the focal length of the lenses is traversed in two orthogonal segments and the photo emitters therefore need not be placed so far away from the lenses.

Turning now to FIGS. 2a and 2b, a second embodiment of a counter 100 according to the invention includes all of the parts described above with respect to the counter 10, with the addition of a second optical window 18j which is located below the optical window 18h and is separated therefrom by a spacer 18i. The second optical window 18j is rotated 45° relative the first optical window 18h as seen best in FIG. 2b. A second pair of sensor arrays 120, 122 and corresponding light sources 124, 126 are arranged with respect to the second optical window in substantially the same manner as the sensor arrays and light sources described above. The rotation of the lower optical window 18j with respect to the upper optical window 18h allows for four different angles of view as objects pass through the sensing/counting section 10b of the counter 100. It will be understood, however, that if the optical windows 18h and 18j are the same size, the spacer 18i must be provided with sloping walls to prevent objects from bouncing off the lower window 18j and registering a redundant count. These walls are shown in FIGS. 2a and 2b as 18i.1-18i.4. According to a preferred aspect of the invention, the height of the spacer 18i is at least one inch, and preferably three to four inches. The height of the spacer allows the slope of the walls to be relatively steep (e.g. 5-10 degrees from vertical) to further discourage object bouncing. For example, in the presently preferred embodiment where the optical windows are approximately 2.5 inches square, a three inch tall spacer would allow the sloped walls to have an angle of approximately 8°-10° from vertical. Those skilled in the art will also appreciate that if the upper optical window is made smaller than the lower optical window, the slope of the walls of the spacer can be made closer to or even equal to vertical.

Figure 4:
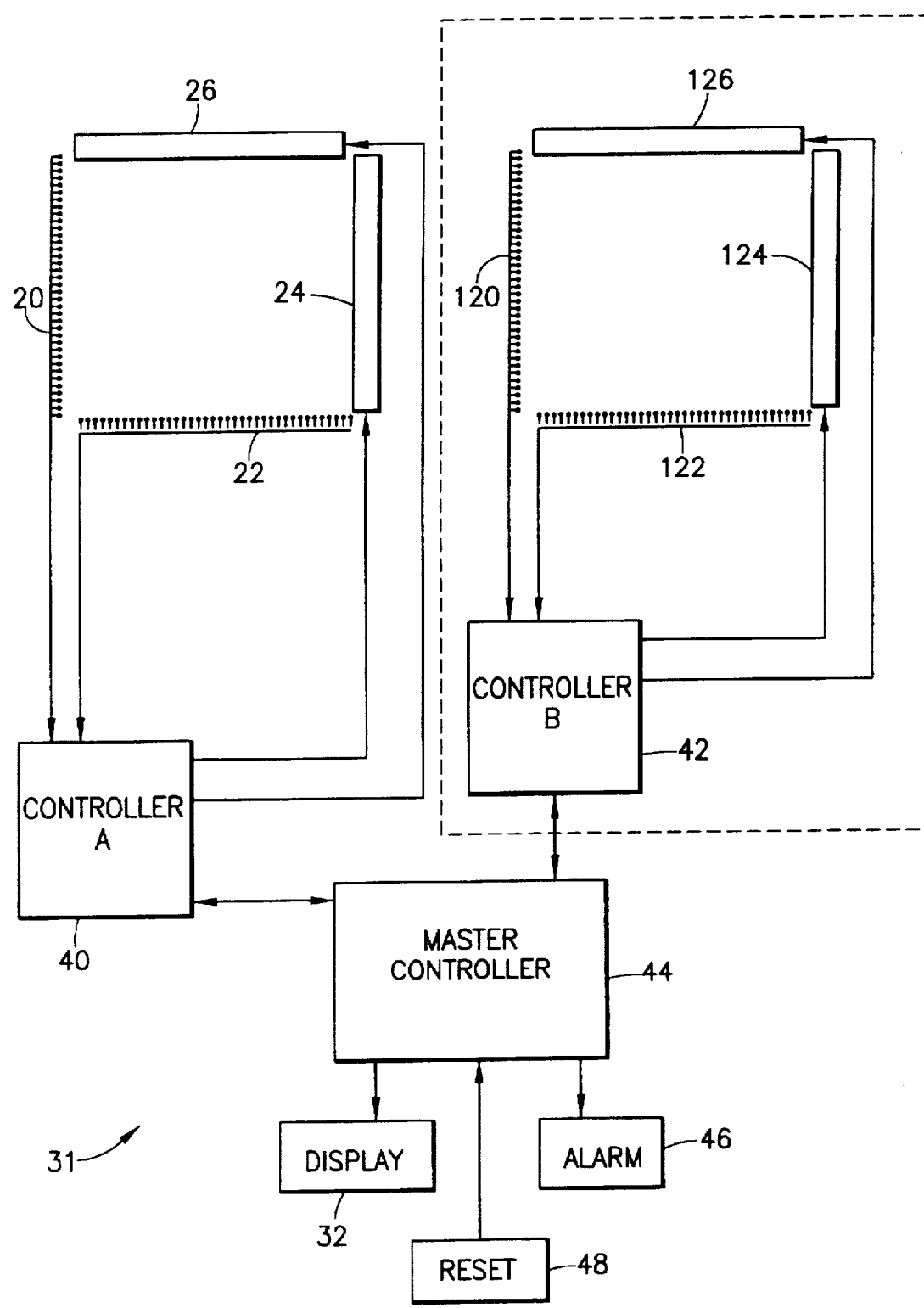
FIG. 4 is a block diagram of the circuit used for processing the outputs of the sensor arrays of FIG. 2 with an additional circuit for processing the outputs of the sensor arrays of FIG. 2a shown in a phantom line box.

Turning now to FIG. 4, and with reference to the first embodiment of the invention and ignoring the portion of FIG. 4 surrounded by phantom lines, the outputs of the sensor arrays 20 and 22 are coupled to a counter controller or microprocessor 40 which is also coupled to the light sources 24, 26. The counter controller 40 is preferably bidirectionally coupled to a master controller 44 which provides output to the aforementioned LCD numeric display 32 and an alarm 46 which preferably includes a sound transducer (not shown) and the aforementioned overspeed indicator 34 (typically an LED). The master controller 44 is also preferably provided with a resetting device 48 such as a "zero" button.

According to the methods of the invention, the controller 40 strobes the light source 24, 26 at a relatively high rate and preferably alternatingly so that only one light source is activated at any instant. According to a presently preferred embodiment of the invention, the light sources are strobed at approximately 1200-1600 Hz with a duty cycle of approximately 5%. As objects pass between each sensor array and its respective light source, shadows will be cast on one or more of the forty-eight sensors in the array. According to the invention, the output of each array is processed as a forty-eight bit binary number wherein sensors which receive light are indicated with a binary zero and sensors which are blocked from receiving light are indicated with a binary 1. Thus, when no object is blocking the path of light to the sensor array, the output of the sensor array will be:

00000000000000000000000000000000000000000000 00000000.

If a single object passes between the light source and the sensor array, the output of the array, for example, might be:

00000000000011111111000000000000000000000000 00000000.

If two objects pass side-by-side between the light source and the sensor array, the output of the array, for example, might be:

00000000000011111111000000000000111111110 000000.

Figure 5:
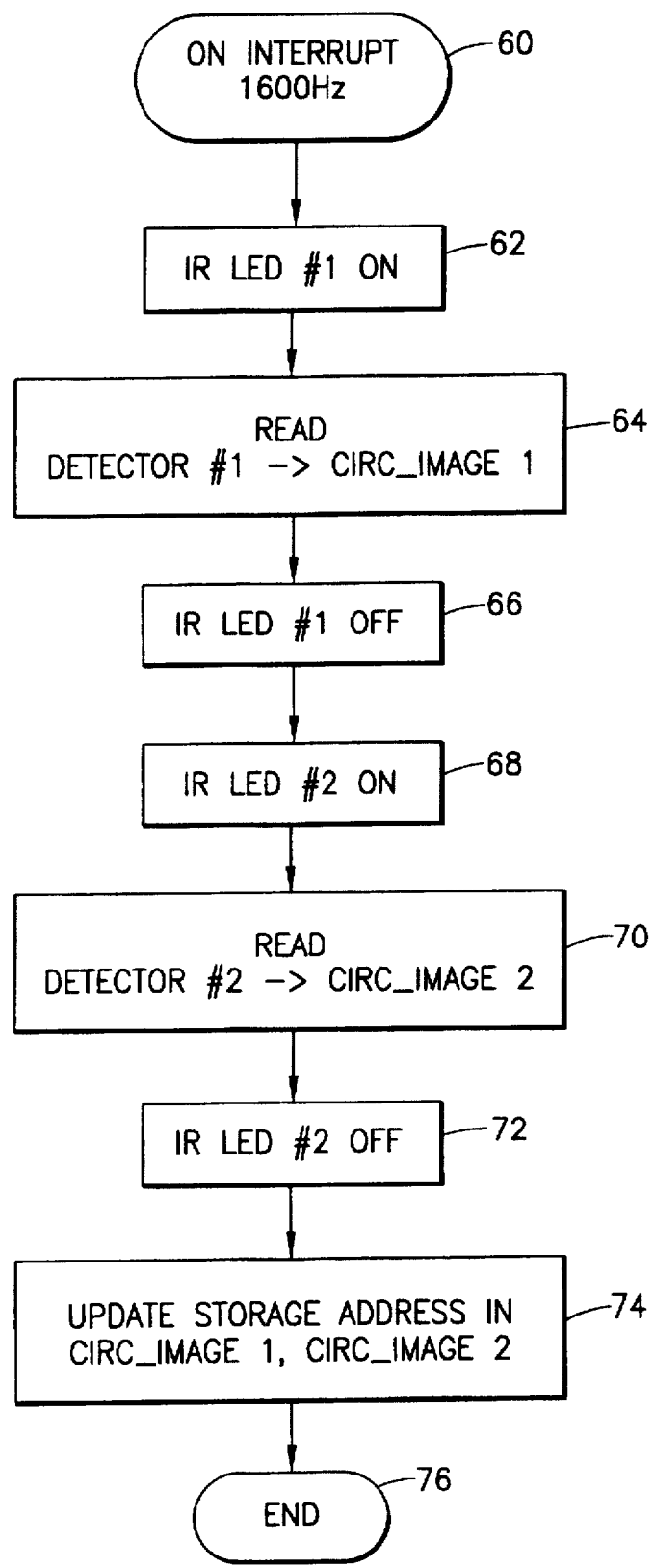
FIG. 5 is a flow chart representing image acquisition by the controller of FIG. 4.

The counter controller 40 is preferably programmed to perform various functional steps which are seen in flow diagram format in FIG. 5. Referring now to FIG. 5, the operations of one controller, e.g. controller 40 is described. Upon an interrupt at 60, the controller activates the first light source, e.g. 24, at 62. The controller reads the output of the first detector 20 at 64 and places the output in a buffer "circ_image 1". The first light source 24 is de-activated at 66 and the second light source 26 is activated at 68. The controller reads the output of the second detector 22 at 70 and places the output in a buffer "circ_image 2". The second light source 26 is deactivated at 72. The controller then updates the addresses of the buffers at 74 and the subroutine ends at 76 until the next interrupt is received at 60. Those skilled in the art will appreciate that the contents of each buffer will be "n" forty-eight bit binary numbers which, when arranged as a 48 x n matrix, reveal a two-dimensional projection of an image of the objects scanned. For example, the image may appear as shown below:

000000000000000000000000000000000001111000000000

00000000000000111000000000000000001111111 10000000

000000000000111111110000000000000111111 110000000

000000000000111111110000000000000111111 110000000

000000000000111111110000000000000111111 110000000

000000000000111111110000000000000111111 110000000

000000000000111111110000000000000111111 110000000

000000000000111111110000000000000111111 110000000

000000000000111111110000000000000111111 110000000

000000000000111111110000000000000111111 110000000

000000000000111111110000000000000001111 000000000

000000000000001111000000000000000000000 000000000 which would represent two objects. Other possible representations of the image are shown and described in the aforementioned co-owned U.S. Pat. No. 5,317,645. Each image (or frame) may be analyzed according to the methods disclosed in U.S. Pat. No. 5,317,645. In addition, as described below with reference to FIGS. 7a and 7b, each image is also preferably analyzed to determine whether the image represents a fragment of an object.

Figure 6:
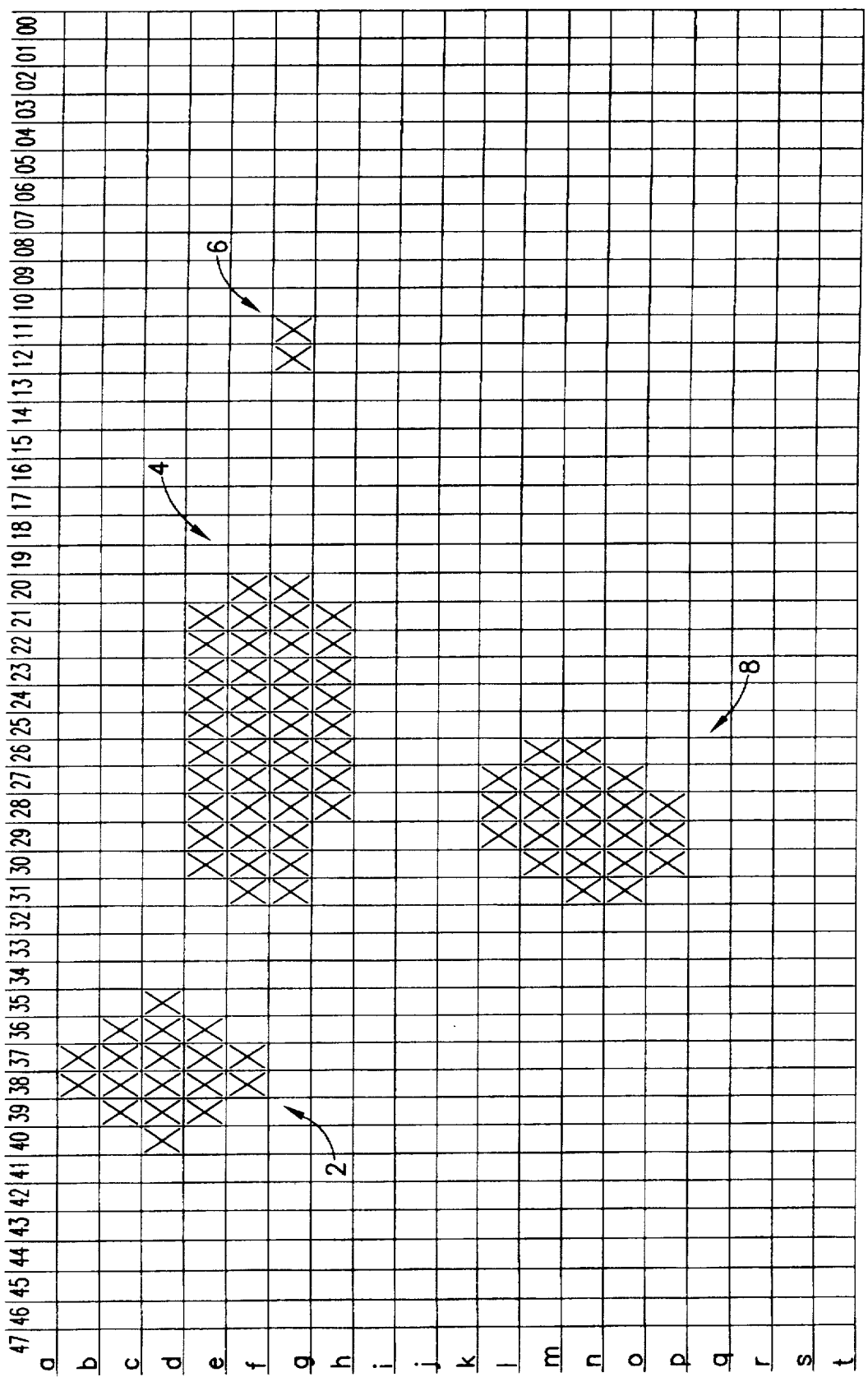
FIG. 6 is a diagram illustrating the images captured by the sensor arrays for image analysis.
Figure 7A:
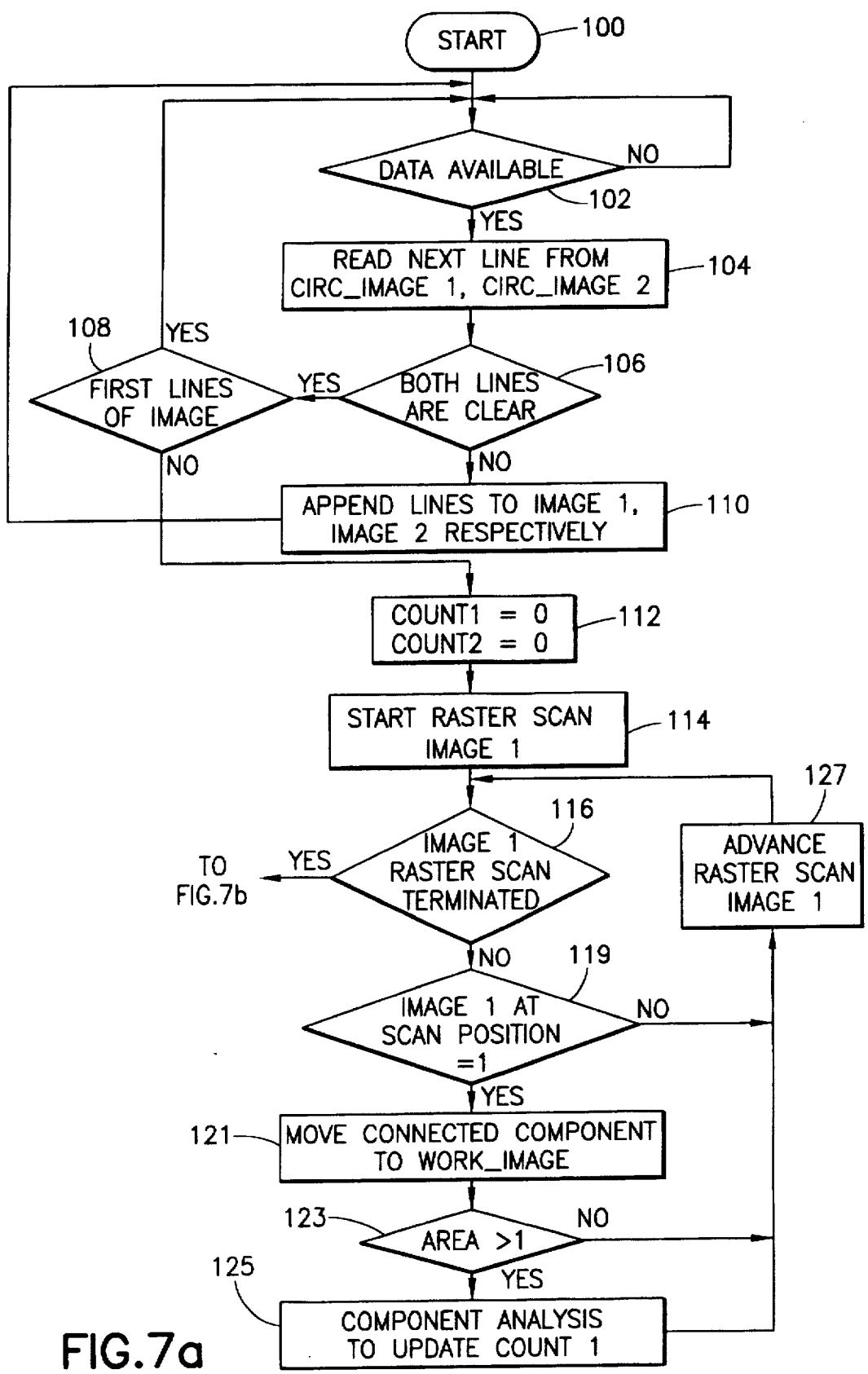
FIGS. 7a, 7b and 7c is a flow chart representing image analysis to determine a count.
Figure 7B:
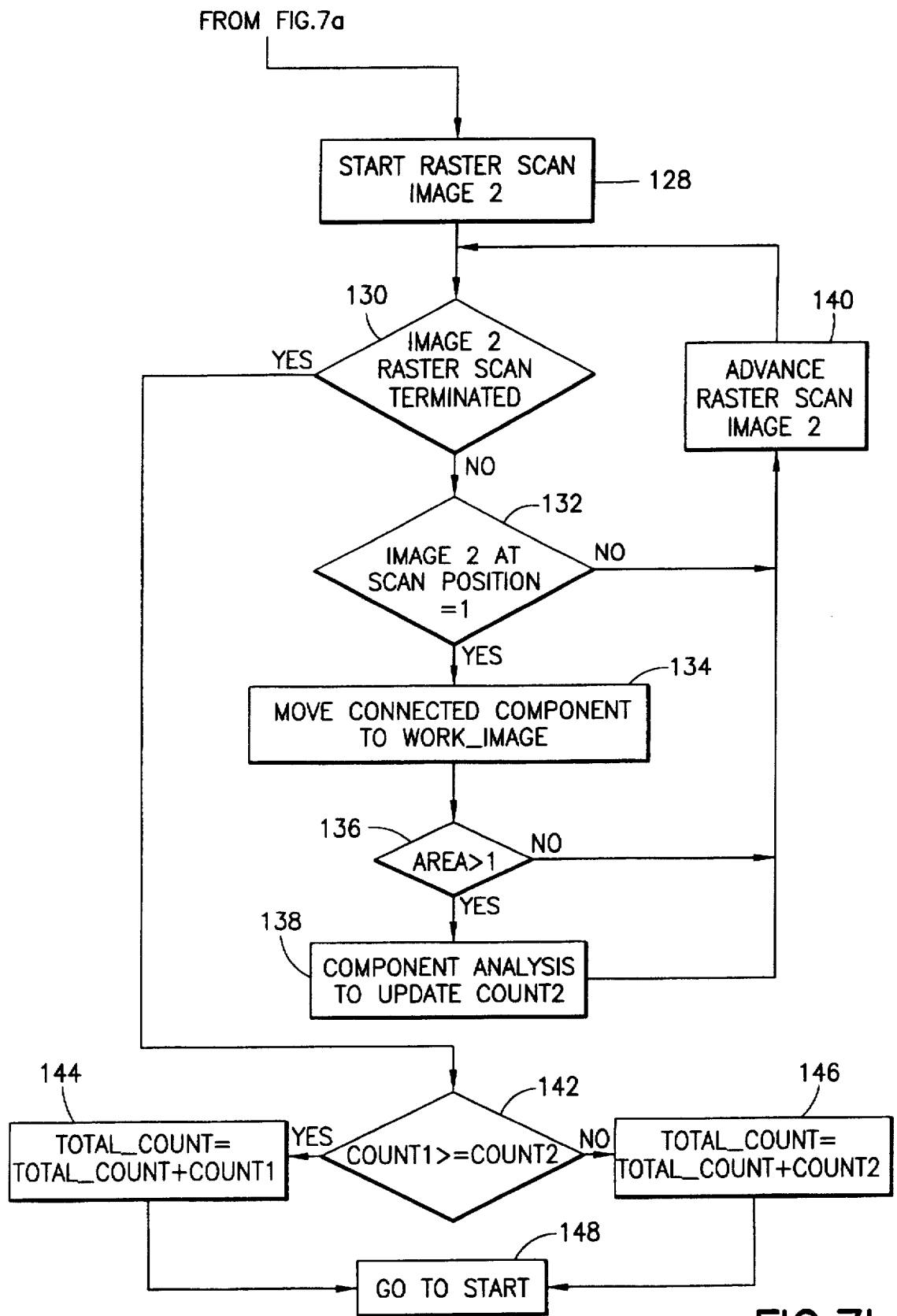

Turning now to FIGS. 6, 7a, and 7b, the contents of the buffers circ_image 1 and circ_image 2 are read line by line to determine the start and the end of an image. An image includes at least one dark pixel (non-zero bit in an array) and typically includes many dark pixels which represent one or several objects. The image represented in each buffer is then separately and conservatively analyzed to determine a count and the higher count is accepted as the accurate count. For example, FIG. 6 shows a schematic rendering of the contents of the buffer circ_image1 as a 48×20 grid wherein empty boxes in the grid represent digital zeros and boxes marked with an X represent digital ones. The image shown in FIG. 6 represents possibly four objects 2, 4, 6, and 8. As will be explained below, the object 6 is an object fragment and will not be counted as an object. Objects 2 and 8 represent end views and object 4 represents a side view.

Figures 2, 7C:
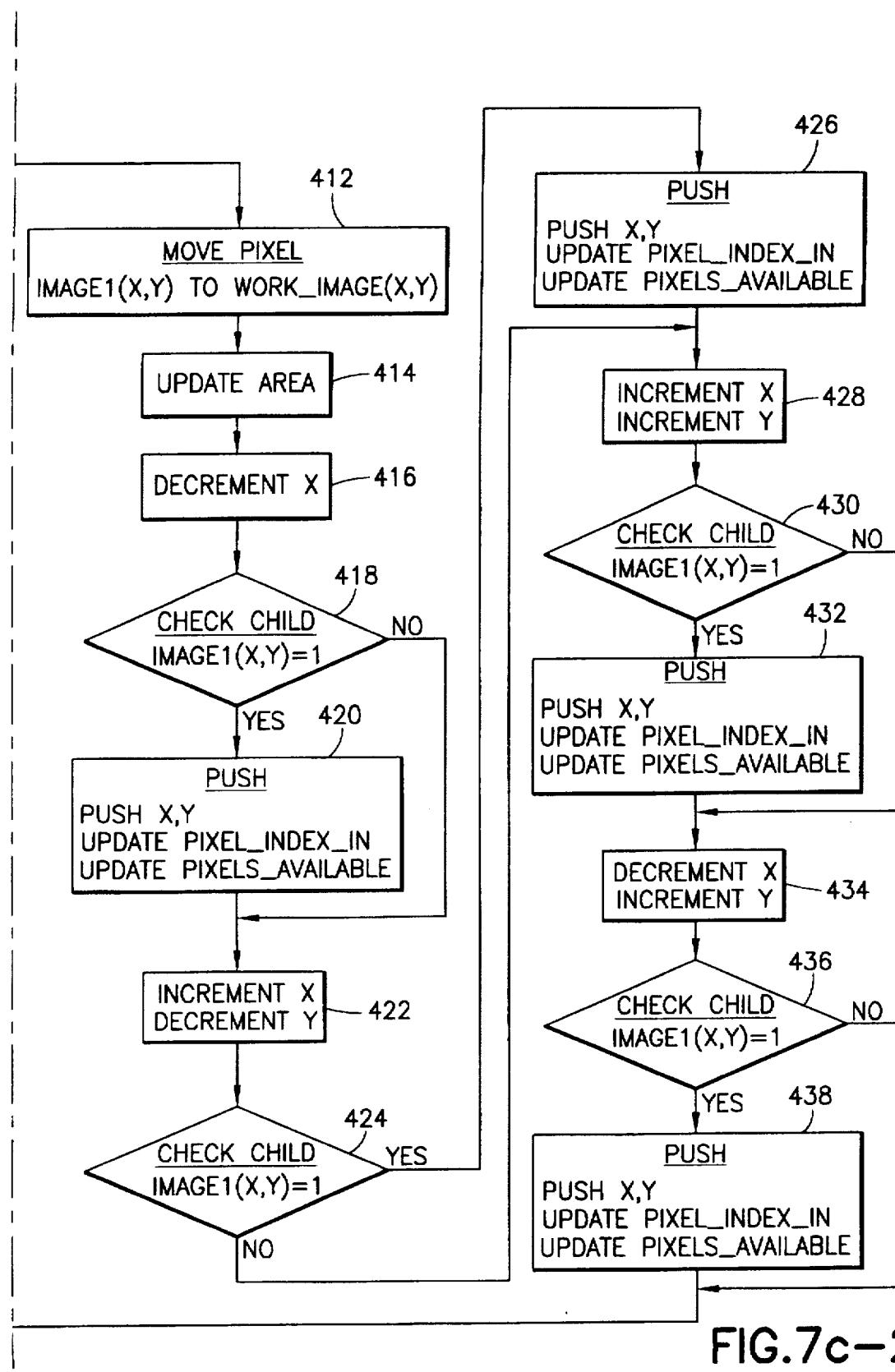

The image buffers circ_image1 and circ_image2 are analyzed according to the methods illustrated in FIGS. 7a–7c. As shown in FIGS. 7a, 7b and 7c, starting at 100, the controller repeatedly reads the buffers at 102 to determine if any new data is available in the buffers circ_image1 and circ_image2. When data becomes available, the first line of data is read from each buffer at 104. The lines of data are analyzed at 106 to determine whether both lines are clear, i.e. all zeros. For example, line "a" in FIG. 6 would be represented in the buffer as all zeros. If the lines from both buffers are clear, it is determined at 108 whether these lines represent the end of an image or the fact that no image has been encountered yet. For example, line "a" in FIG. 6 represents the fact that no image has been encountered yet and line "i" in FIG. 6 represents the end of an image. If the line read represents no image encountered yet, the controller returns to 102 and prepares to read the next line from each buffer circ_imagel and circ_image2 at 104. If at least one line read is not clear, as determined at 106, both lines are appended to "image1" and "image2" (additional buffers, not shown) at 110. The controller continues to repeat this process until it again finds that both lines from the buffers circ_image1 and circ_image2 are clear at 106. For example, lines "b" through "h" in FIG. 6 would be appended to the buffer "image1". Line "i" in FIG. 6 indicates the end of the images which is determined at 108 in FIG. 7a. Prior to analyzing image1 and image2, the controller sets count1 and count2 to zero at 112. Both image1 and image2 are "raster scanned". That is, each bit of each line of the buffer image1 and image2 is read. As described above, the contents of the buffer image1 at this point in the analysis is represented in FIG. 6 as lines "b" through "h".

Generally, the scanning of image1 is commenced at 114. Scanning continues until terminated at 116. At 119, it is determined whether the bit (pixel) at the scan position is a digital one or a digital zero. For example, referring again to FIG. 6, raster scanning would begin at the position b00 and move across to position b47, continue from c00, etc. After scanning each position, if the position does not contain a digital one, the raster scan position is advanced at 127 and this is repeated until scan is terminated at 116 or the raster scan position is determined at 118 to be a 1. The first time the raster scan detects a digital one, e.g. at b37 in FIG. 6, a subroutine "Move connected component to work_image" is performed at 121 (and described in detail below with reference to FIG. 7c). The main task of this routine is to copy the entire cluster of "ones" connected to the detected "one" into a new array named "work_image". A further task of this routine is to count the number of "ones" in the given cluster. Each cluster is referred to as a "connected component". At 123 in FIG. 7a, it is determined whether the connected component represents one or more objects or whether it is simply noise. If the area of the connected component is 1, it is considered to represent noise and the raster scan is advanced to the next pixel at 127. If the area is greater than 1, the connected component is preferably conservatively analyzed at 125 to determine how many objects it represents and to update the count1 for image1 accordingly. The analysis at 125 is preferably performed according to co-owned U.S. Pat. No. 5,317,645 and also includes a comparison of the area of the connected component with a known average area to determine if the connected component represents a fragment. The raster scan is again advanced at 127 and the process continues until all the lines of image1 have been scanned. This is determined at 116 whereupon the scanning of image2 is commenced at 128.

The raster scanning of image2 (FIG. 7b) proceeds in substantially the same manner as the raster scanning of image1 until terminated at 130. At 132, it is determined whether the pixel scanned is a one or a zero. If it is a zero, the raster scan is advanced at 140 and this is repeated until scan is terminated at 130 or the pixel scanned is determined at 132 to be a one. The first time a non-zero pixel is encountered in the raster scan, the subroutine "move connected component to work_image" is called at 134. The subroutine, mentioned above and described in detail below, determines whether the pixel is an orphan having an area of only one or part of a cluster having an area greater than one. If the area is not greater than one as determined at 136, the raster scan is advanced to the next pixel at 140. If the area of the work_image is greater than one as determined at 136, the area is preferably conservatively analyzed at 138 and count2 is updated for image2 accordingly. The raster scan is again advanced at 140 and the process continues until all the lines of image2 have been scanned. This is determined at 130 whereupon count1 and count2 are compared at 142. If count1 >count2, the total_count is incremented by count1 at 144. If count2>count1, the total_count is incremented by count2 at 146. At 148, the controller returns to the start 100 (FIG. 7a) to analyze another two images. It will be recognized that, each image is counted individually in order to provide a total count. Preferably, though not shown in FIGS. 7a-7c, the counter controller will maintain counts for the number of images which were analyzed as containing one object, the number of images which were analyzed as containing two objects, the number of images which were analyzed as containing three objects, etc.

FIG. 7c illustrates the operation of the subroutine "move connected component to work_image" referred to above with reference to FIG. 7a at 121. It will be understood that the subroutine "move connected component to work_image" referred to above with reference to FIG. 7b at 134 operates in the same manner, but with reference to image2 rather than image1. In general, when a non-zero pixel is encountered in the scan of image1, the subroutine will look at four surrounding pixels to determine whether any of them are also non-zero pixels. The surrounding pixels are referred to as child pixels and the surrounded pixel is referred to as a parent pixel. In addition, each non-zero child pixel will be treated as a parent and its children will be examined. So long as new children are found, the process will continue until the area of an entire "connected component" is counted. In order to keep track of which pixels have been examined and which have not, the routine uses a stack which records the x-y coordinates of parent pixels which need to be examined. The stack is a FIFO stack from which data is popped in the same order in which it has been pushed. As mentioned above, the connected component is thus incrementally copied into the two dimensional array called "work_image".

Turning now to FIG. 7c, the routines 121, 134 begin with initializing variables at 400. Pixels_available counts the number of parent pixels that are in the stack in queue to be examined and it is initialized to zero. Pixel_index_in is the index by which new pixel x-y data is pushed into the stack and it is initialized to zero, the first location in the stack. Pixel_index_out is the index by which pixel x-y data is popped from the stack and it is initialized to zero. The variable "area" is the total number of pixels in the connected component and it is initialized to zero. At 402, the pixel encountered at 119, 132 (FIGS. 7a, 7b) is pushed into the stack, the variable pixel_index_in is updated, and the variable pixels_available is incremented by one. If it is determined at 404 that pixels_available=0, the process is complete and returns at 406 to 123, 136 (FIGS. 7a, 7b). Otherwise, the process continues at 408 to pop the next pixel from the queue, the variable pixel_index_out is updated, and the variable pixels_available is decremented by one. The popped pixel is examined at 410. If the popped pixel is zero, it means that the pixel was cleared in a previous iteration of the routine at 412 and can not become a parent to new children. In this case, the routine returns to 404 to pop another pixel if there is one available. If the popped pixel is determined at 410 to be a one, it is copied at 412 to work_image and deleted from image1; i.e., the location variable image1(x,y) is set to zero and the location variable work_image (x,y) is set to one. The area of the work_image is incremented by one at 414, and the x-coordinate of the parent pixel is decremented at 416 so that the child pixel to its right can be examined at 418. If the child pixel has the value 1, it is pushed into the stack at 420 and variables are updated as described above with reference to 402. In this way, the child pixel will be examined later as a parent pixel when the routine eventually returns to 408. If the child pixel has the value 0 as determined at 418, the routine continues to step 422 without pushing the pixel into the stack. At 422, the x-coordinate is incremented and the y-coordinate is decremented so that the next child pixel examined is located directly above the parent pixel. Steps 424 and 426 are substantially the same as steps 418 and 420. Both the x and y coordinates are incremented at 428 so that the next child pixel examined is located to the left of the parent pixel. Steps 430 and 432 are substantially the same as steps 418 and 420. At 434, the x-coordinate is decremented and the y-coordinate is incremented so that the next child pixel examined is located directly below the parent pixel. Steps 436 and 438 are substantially the same as steps 418 and 420. Now that the four children of the parent pixel have been examined and all of the non-zero children have been pushed into the stack, the routine returns to 404 to examine each of the non-zero child pixels as parents.

The methods described above apply to the first and presently preferred embodiment of the apparatus as shown in FIGS. 2 and 3. Those skilled in the art will appreciate that the methods described above may be duplicated for use in the second embodiment of the apparatus shown in FIGS. 2a and 2b. For example, as shown in the phantom line box of FIG. 4, an additional controller 42 may be provided to control the light sources 124, 126 and the sensor arrays 120, 122.

Figure 8A:
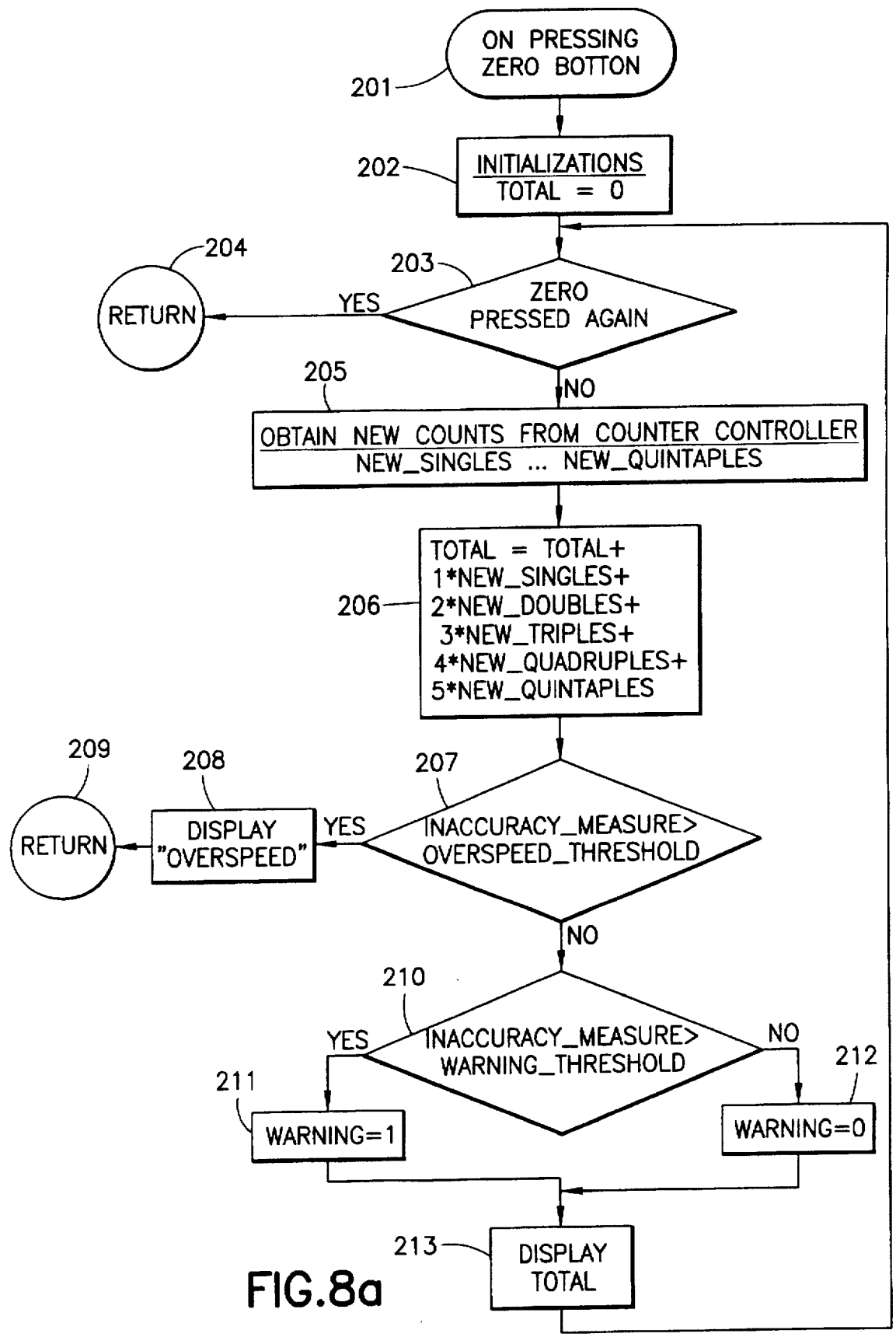
FIGS. 8a and 8b are flow charts illustrating processing of the counts determined from image analysis.
Figure 8B:
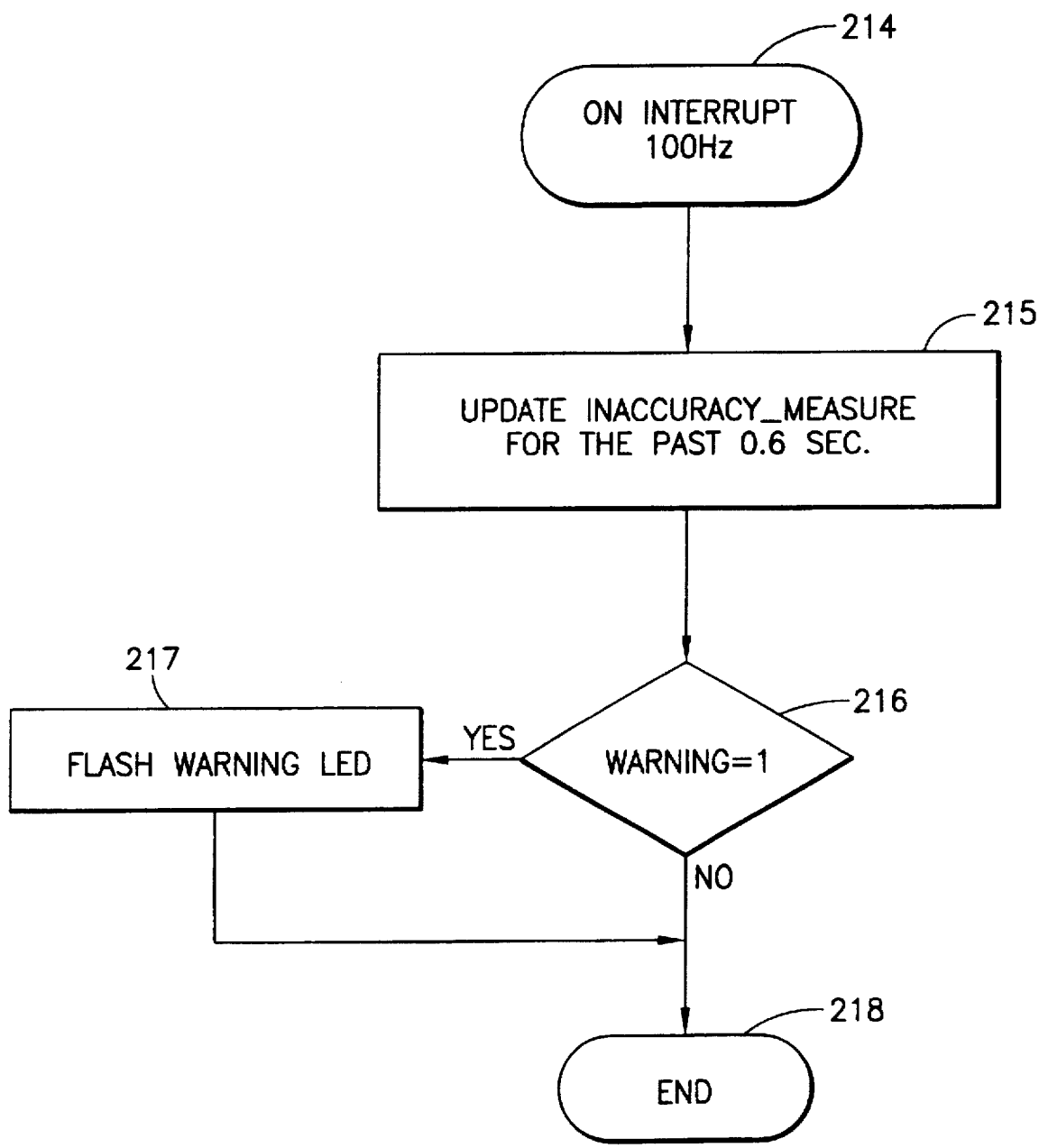

FIGS. 8a and 8b show flow charts for the programming of the master controller (44 in FIG. 4). Referring now to FIGS. 8a and 8b, the main routine is initialized when a user presses the ZERO button at 201. The total count is set to zero at 202. If the ZERO button is pressed again during iterations of the routine, it is detected at 203 and returns at 204 to 201. Barring a halt by the ZERO button, the routine obtains count information at 205 from the counter controller (40 in FIG. 4). According to a presently preferred method, the counter controller provides the master controller with up to five different counts. Each count relating to a number of images of a number of objects. For example, as shown in FIG. 8a, the counts received from the counter controller are designated new_singles, new_doubles, new_triples, new_quadruples, and new_quintuples. The new_singles count refers to the number of images determined by the counter controller to represent single objects. The new_doubles count refers to the number of images determined by the counter controller to represent two objects, etc. The total number of objects is computed at 206 by multiplying each of the counts by the appropriate number, summing the products, and adding to a previous total. After computing the total count, the routine determines at 207 whether an overspeed condition is present by comparing a periodically updated "inaccuracy_measure" to a constant "overspeed_threshold". If an overspeed condition is determined at 207, an overspeed indicator is triggered at 208 and the routine returns at 209 to 201. If it is determined at 207 that no overspeed condition exists, it is determined at 210 whether a preset warning_threshold has been exceeded. If the warning_threshold has been exceeded, a warning flag is set at 211 to "1". If not, the warning flag is set at 212 to "0". The display is then updated at 213 and the routine returns to 203 to obtain more new counts or be halted by the ZERO button.

The routine shown in FIG. 8a is interrupted at intervals of 10 ms to obtain an updated inaccuracy_measure which is used to determine an overspeed condition and set a warning flag as described above. The inaccuracy_measure is an indication of how quickly objects are falling past the sensors. According to the invention, if objects are poured into the counter at too high a rate, an accurate count cannot be assured. In the presently preferred embodiment, the inaccuracy_measure is a weighted sum of the clustered objects counted during the last 0.6 seconds. According to the presently preferred embodiment, the inaccuracy_measure is the sum of new_singles_06+4*new_doubles_06 +9* (new_triples_06+new_quadruples_06+new_quintuples_06), where new_singles_06 is the number of new_singles received in the past 0.6 seconds, new_doubles_06 is the number of new_doubles received in the past 0.6 seconds, etc. The inaccuracy_measure is therefore a function of the actual rate at which objects are poured as well as a function of the tendency of the objects to cluster.

FIG. 8b shows a flow chart of the routine for updating the inaccuracy_measure. On a 100 Hz interrupt at 214, the inaccuracy_measure is updated at 215. At 216, the previously set warning flag is checked and if the flag is set to "1", a warning indicator is triggered at 217. The routine ends at 218. It will be appreciated that, although not required, the overspeed threshold and the warning threshold values can be set according to the accuracy requirements of the user.

The counter according to the invention does not require a vibratory feeder, but may be subject to overspeed feeding if objects are poured into the feeding funnel too quickly. As described above, the invention determines an overspeed condition which is a function of the extent of bunching, and warns the operator. However, depending on the number of objects to be counted, it may be desirable to provide other means for preventing overspeed feeding. For example, when counting a relatively small number of objects (e.g., fifty), it may be convenient to simply "dump" the contents as a batch into the feeding funnel. However, feeding fifty objects as a batch could lead to an overspeed feeding condition. Therefore, in order to accommodate a batch, the invention provides a variable delay feeding tube.

Figure 9:
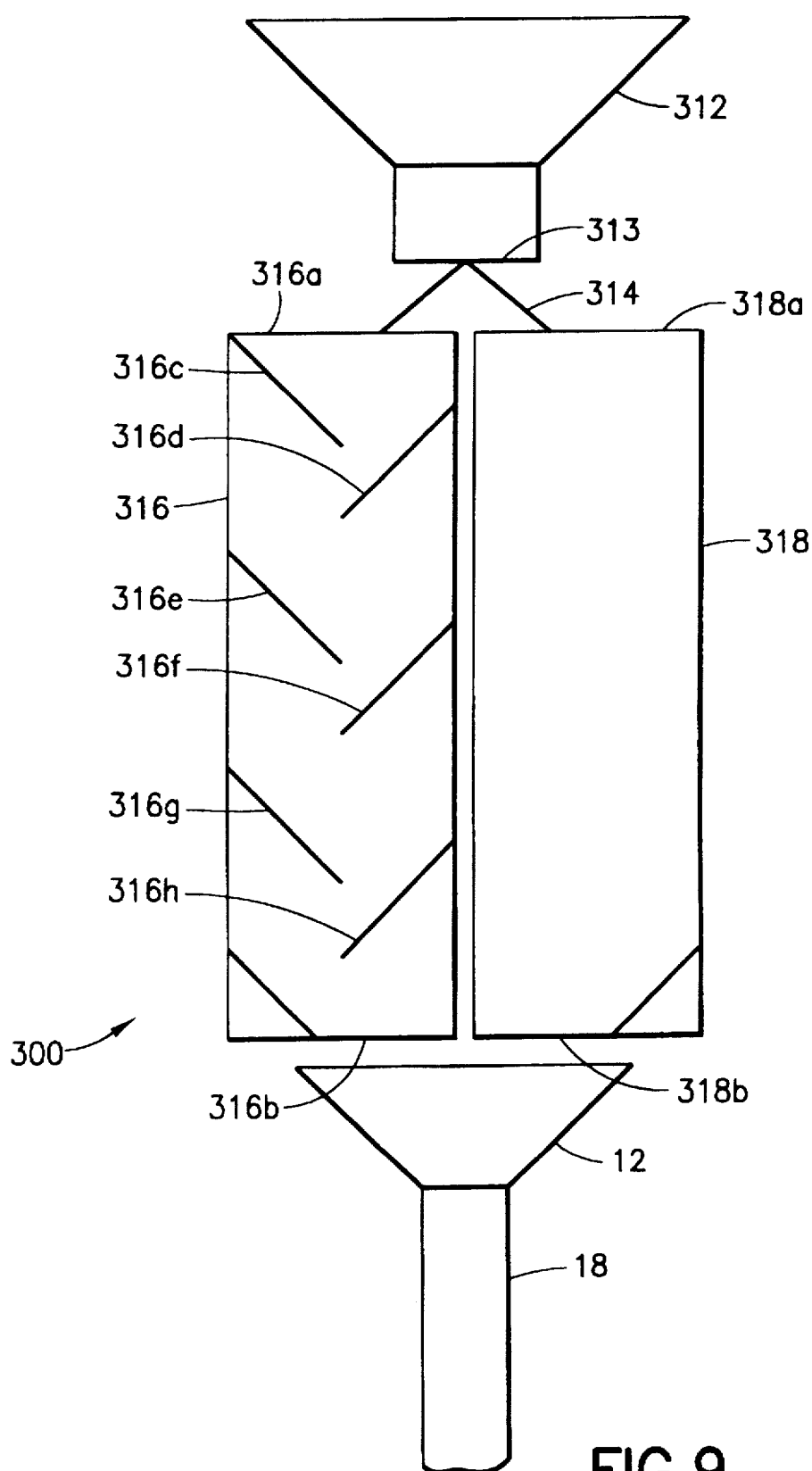
FIG. 9 is a transparent side elevation view of a variable delay feeding tube according to another embodiment of the invention.

Turning now to FIG. 9, a variable delay feeding tube 300 according to the invention is mounted above the feeding funnel 12 described above. The feeding tube 300 includes an upper funnel 312, a channel deflector 314, and at least two feeding channels 316, 318. The outlet 313 of the funnel 312 is arranged above the channel deflector 314. Each feeding channel 316, 318 has an upper inlet 316a, 318a and a lower outlet 316b, 318b. The feeding channel 316 is provided with a plurality of angled baffles 316c–316h. The outlets 316b, 318b of the channels are arranged above the feeding funnel 12, and the inlets 316a, 318a of the channels are arranged below the channel deflector 314. When objects are poured into the funnel 312, they exit the funnel at 313 and are deflected by the channel deflector 314, randomly, into either the channel 316 or the channel 318. The objects which enter the channel 316 are delayed by the baffles 316c–316h before exiting the channel at 316b. The objects which enter the channel 318, however, proceed directly to the exit 318b of the channel. The variable delay feeding tube 300, therefore, has the effect of regulating the rate at which objects enter the feeding funnel 12 as well as separating objects from each other in the vertical direction. Those skilled in the art will appreciate that the number and placement of the baffles and the number of channels with different baffle arrangements may be adjusted according to empirical analysis to accommodate a desired number of objects. Using the variable delay tube 300, a relatively large number of objects can be "dumped" into the funnel 312 for eventual counting by the counter described above.

There have been described and illustrated herein several embodiments of a method an apparatus for optically counting discrete objects. While particular embodiments of the invention have been described, it is not intended that the invention be limited thereto, as it is intended that the invention be as broad in scope as the art will allow and that the specification be read likewise. Thus, while particular circuit arrangements have been disclosed, it will be appreciated that other circuits could be utilized to effect the methods of the invention. For example, different strobe rates and duty cycles could be utilized. Also, rather than having separate microprocessors, a single microprocessor could be utilized. Further, while a presently preferred configuration of a counter housing has been shown, it will be recognized that other types of housing arrangements could be used with similar results obtained. Thus, for example, the feeding channel, rather than being angled at forty-five degrees relative to the front of the housing could be aligned with the housing. Furthermore, while the invention was described as always utilizing the larger or largest of the independently but conservatively derived object count during counting, those skilled in the art will appreciate that where the separate object counts are derived liberally, the smaller or smallest of the independently liberally derived object counts could be used. It will therefore be appreciated by those skilled in the art that yet other modifications could be made to the provided invention without deviating from its spirit and scope as so claimed.

We claim:

1. An apparatus for optically counting discrete objects, comprising:

a) a substantially vertical feeding channel having an upper end for receiving the objects;

b) first and second substantially collimated light sources arranged substantially orthogonally, substantially horizontally, and adjacent said feeding channel;

c) first and second photo-electric sensor arrays arranged substantially orthogonally, substantially horizontally, and adjacent said feeding channel such that light from said first light source is detected by said first sensor array and light from said second light source is detected by said second sensor array, each of said sensor arrays having an output;

d) processing means coupled to said outputs of said first and second sensor arrays for separately processing said outputs; and e) numeric display means coupled to said processing means for displaying a total count of the objects, wherein the objects which enter said feeding channel pass between said light sources and said sensor arrays to cast shadows on said sensor arrays, said processing means detects said shadows on said sensor arrays by separately processing said outputs of said sensor arrays, determines separate counts of how many objects have cast shadows on each of said sensor arrays, consistently chooses the larger or smaller of said separate counts, and increments the numeric display by the amount of the chosen larger or smaller count.

2. An apparatus according to claim 1, wherein:
said processing means consistently chooses said larger separate count.

3. An apparatus according to claim 1, further comprising:

f) a feeding funnel having a substantially frustroconical section with a narrow end, said narrow end being coupled to said upper end of said feeding channel, wherein a distance between said narrow end and said first and second sensor arrays is approximately eight inches.

4. An apparatus according to claim 1, wherein:
said feeding channel has a substantially rectangular cross-section.

5. An apparatus according to claim 3, wherein:
said feeding channel has first and second horizontal dimensions, and said objects have a longest dimension, wherein said first and second horizontal dimensions are at least two and one half times said longest dimension of said discrete objects.

6. An apparatus according to claim 5, wherein:
said first and second horizontal dimensions are each at least two and one-half inches.

7. An apparatus according to claim 1, further comprising:

f) third and fourth substantially collimated light sources arranged substantially orthogonally, substantially horizontally, and adjacent said feeding channel below said first and second light sources; and g) third and fourth photo-electric sensor arrays arranged substantially orthogonally, substantially horizontally, and adjacent said feeding channel below said first and second sensor arrays such that light from said third light source is detected by said third sensor array and light from said fourth light source is detected by said fourth sensor array, each of said sensor arrays having an output, wherein said processing means is coupled to said outputs of said third and fourth sensor arrays, and said processing means separately processes said outputs of said first, second, third, and fourth sensor arrays, determines separate counts of how many objects have cast shadows on each of said sensor arrays, consistently chooses the largest or smallest of said separate counts and increments the numeric display by the amount of the chosen largest or smallest count.

8. An apparatus according to claim 7, wherein:
said processing means consistently chooses said largest separate count.

9. An apparatus according to claim 1, further comprising:

f) overspeed indication means coupled to said processor means for indicating an overspeed feeding condition, wherein said processing means includes timer means for timing a period of time, means for determining a first number of how many times single ones of the objects are detected during said period of time, means for determining a second number how many times a group of at least two objects are detected during said period of time, means for taking a function of said first number and second number to provide a third number, and means for comparing said third number to a first preset threshold number, said processing means activating said means for indicating an overspeed feeding condition based on a comparison of said means for comparing.

10. An apparatus according to claim 1, further comprising:

f) deflector means located below said first and second sensor arrays for preventing objects from bouncing back past said sensor arrays.

11. An apparatus according to claim 1, further comprising:

f) a variable delay feeding tube coupled to said upper end of said feeding channel and having at least two second feeding channels, each of said second feeding channels providing a different delay to the discrete objects traversing said second feeding channels.

12. An apparatus for optically counting discrete objects having a longest dimension, comprising:

a) a substantially vertical feeding channel having an upper end for receiving the objects, said feeding channel being at least six inches tall and a rectangular cross-section with first and second horizontal dimensions which are at least two and one half times said largest dimension of said discrete objects;

b) first and second substantially collimated light sources arranged substantially orthogonally, substantially horizontally, and adjacent said feeding channel;

c) first and second photo-electric sensor arrays arranged substantially orthogonally, substantially horizontally, and adjacent said feeding channel such that light from said first light source is detected by said first sensor array and light from said second light source is detected by said second sensor array, each of said sensor arrays having an output:

d) processing means coupled to said outputs of said first and second sensor arrays for processing said outputs;

e) numeric display means coupled to said processing means for displaying a total count of the objects; and f) a variable delay feeding tube coupled to said upper end of said feeding channel and having at least two second feeding channels, each of said second feeding channels providing a different delay to the discrete objects traversing said second feeding channels.

13. A method of optically counting discrete objects comprising:

a) providing a substantially vertical feeding channel having an upper end for receiving the objects;

b) locating first and second substantially collimated light sources substantially orthogonally, substantially horizontally, and adjacent the feeding channel;

c) locating first and second photo-electric sensor arrays substantially orthogonally, substantially horizontally, and adjacent the feeding channel such that light from the first light source is detected by the first sensor array and light from the second light source is detected by the second sensor array, and the objects which enter the feeding channel pass between the light sources and the sensor arrays to cast shadows on the sensor arrays;

d) separately processing the outputs of the first and second sensor arrays to determine separate counts of how many objects have cast shadows on each of the sensor arrays;

e) consistently choosing the larger or smaller of the separate counts; and f) incrementing a numeric display by the amount of the chosen larger or smaller count.

14. A method according to claim 13, wherein:

said larger of said separate counts is consistently chosen.

15. A method according to claim 13, further comprising:

g) locating third and fourth substantially collimated light sources substantially orthogonally, substantially horizontally, and adjacent the feeding channel below the first and second light sources;

h) locating third and fourth photo-electric sensor arrays substantially orthogonally, substantially horizontally, and adjacent the feeding channel below the first and second sensor arrays such that light from the third light source is detected by the third sensor array and light from the fourth light source is detected by the fourth sensor array, and the objects which enter the feeding channel pass between the light sources and the sensor arrays to cast shadows on the sensor arrays;

i) separately processing the outputs of the first, second, third, and fourth sensor arrays to determine four separate counts of how many objects have cast shadows on each of the sensor arrays;

j) consistently choosing the largest or smallest of the four separate counts; and k) incrementing the numeric display by the amount of the chosen largest or smallest count.

16. A method according to claim 13, further comprising:

g) monitoring the rate of said incrementing according to the amount of the increment;

h) indicating a first overspeed feeding condition when the rate exceeds a first preset threshold.

17. A method according to claim 16, further comprising:

i) indicating a second overspeed feeding condition when the rate exceeds a second preset threshold.

18. A method according to claim 17, further comprising:

j) discontinuing counting when the rate exceeds a second preset threshold.

* * * * *